US010805841B2

(12) United States Patent
Livanos et al.

(10) Patent No.: US 10,805,841 B2
(45) Date of Patent: Oct. 13, 2020

(54) POLICY ENFORCEMENT METHODS AND APPARATUS FOR BACKGROUND DATA TRANSFERS INVOLVING MULTIPLE UES

(71) Applicant: Cisco Technology, Inc., San Jose, CA (US)

(72) Inventors: Konstantin Livanos, Naperville, IL (US); Ian McDowell Campbell, Littleton, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/042,630

(22) Filed: Jul. 23, 2018

(65) Prior Publication Data
US 2020/0029249 A1 Jan. 23, 2020

(51) Int. Cl.
*H04W 28/24* (2009.01)
*H04W 8/02* (2009.01)
(Continued)

(52) U.S. Cl.
CPC ............. *H04W 28/24* (2013.01); *H04W 8/02* (2013.01); *H04W 8/24* (2013.01); *H04W 28/0268* (2013.01); *H04W 28/20* (2013.01)

(58) Field of Classification Search
None
See application file for complete search history.

(56) References Cited

U.S. PATENT DOCUMENTS

| 8,914,810 | B1 | 12/2014 | Brockners |
| 9,609,632 | B2 | 3/2017 | Kim et al. |

(Continued)

FOREIGN PATENT DOCUMENTS

| WO | 2011/054300 A1 | 5/2011 |
| WO | 2013167160 A1 | 11/2013 |

(Continued)

OTHER PUBLICATIONS

3rd Generation Partnership Project; Technical Specification Group Services and System Aspects; Architecture enhancements to facilitate communications with packet data networks and applications, 3GPP TS 23.682 V15.5.0, Jun. 19, 2018, p. 15 and 51 (Year : 2018).*

(Continued)

*Primary Examiner* — Alex Skripnikov
*Assistant Examiner* — Sharmin Chowdhury

(57) ABSTRACT

A policy enforcement technique may be performed at a network node configured for exposure of services and capabilities, such as a service and capability exposure function (SCEF) or a network exposure function (NEF). In one illustrative example, the network node may receive a message which includes a request for background data transfer from an application server (AS) to a plurality of UEs of a group. The message may include mobile-terminated (MT) data to be delivered, a group ID associated with the group, a total bandwidth for the background data transfer for the group, and a transfer policy ID associated with a transfer policy. The network node may verify whether the total bandwidth for the background data transfer for the group is within a predefined aggregate bandwidth limit indicated in the transfer policy data. The network node may cause the background data to be sent to each one of the plurality of UEs via the mobile network, if the total bandwidth is within the predefined aggregate bandwidth limit. In some implementations, the network node may be configured to facilitate background data transfers and perform policy enforcement for transfers involving both IP data delivery and non-IP data delivery (NIDD).

20 Claims, 8 Drawing Sheets

(51) Int. Cl.
*H04W 28/20* (2009.01)
*H04W 28/02* (2009.01)
*H04W 8/24* (2009.01)

(56) References Cited

U.S. PATENT DOCUMENTS

| | | | |
|---|---|---|---|
| 2011/0320620 A1* | 12/2011 | Cutler | H04L 63/102 |
| | | | 709/229 |
| 2013/0058259 A1 | 3/2013 | Wu et al. | |
| 2015/0189539 A1* | 7/2015 | Li | H04W 28/24 |
| | | | 370/230 |
| 2016/0007316 A1* | 1/2016 | Vaidya | H04W 68/02 |
| | | | 370/312 |
| 2017/0317894 A1 | 11/2017 | Dao | |
| 2018/0020369 A1 | 1/2018 | Parra et al. | |
| 2018/0049156 A1 | 2/2018 | Laha et al. | |
| 2018/0077714 A1 | 3/2018 | Kodaypak et al. | |
| 2018/0192471 A1 | 7/2018 | Li et al. | |
| 2018/0227837 A1 | 8/2018 | Starsinic et al. | |
| 2018/0262941 A1 | 9/2018 | Huang et al. | |
| 2018/0270778 A1 | 9/2018 | Bharatia | |
| 2018/0278698 A1 | 9/2018 | Joseph et al. | |
| 2018/0324652 A1 | 11/2018 | Ryu et al. | |
| 2018/0343601 A1 | 11/2018 | Livanos | |
| 2019/0069221 A1* | 2/2019 | Virgile | H04W 48/14 |
| 2019/0166016 A1 | 5/2019 | Livanos et al. | |
| 2019/0230492 A1 | 7/2019 | Suzuki et al. | |
| 2019/0268230 A1* | 8/2019 | Huang | H04L 41/0893 |

FOREIGN PATENT DOCUMENTS

| | | |
|---|---|---|
| WO | 2015172079 A1 | 12/2015 |
| WO | 2016024789 A1 | 2/2016 |
| WO | 2017023748 A1 | 2/2017 |

OTHER PUBLICATIONS

3GPP Organizational Partners, "3rd Generation Partnership Project; Technical Specification Group Services and System Aspects; Procedures for the 5G System; Stage 2 (Release 15)", 3GPP TS 23.502 V15.2.0, Jun. 2018, 308 pages.

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.9.0, Sep. 2018, 394 pages.

3GPP Organizational Partners, "3rd Generation Partnership Project; Technical Specification Group Services and System Aspects; Policy and charging control architecture (Release 14)", 3GPP TS 23.203 V14.6.0, Jun. 2018, 257 pages.

"Digitial Cellular Telecommunications System (Phase 2+) (GSM); Universal Mobile Telecommunications System (UMTS); LTE; Architecture Enhancements to Facilitate Communications with Packet Data Networks and Applications (3GPP TS 23.682 Version 14.6.0 Release 14)"; ETSI TS 123 682 V14.6.0 (Jan. 2018); pp. 1-110.

"Universal Mobile Telecommunications System (UMTS); LTE; Service Capability Exposure Functionality Over Nt Reference Point (3GPP TS 29.154 Version 14.2.0 Release 14)"; ETSI TS 129 154 V14.2.0 (Jul. 2017); pp. 1-17.

"Universal Mobile Telecommunications System (UMTS); LTE; Policy and Charging Control Over Rx Reference Point (3GPP TS 29.214 Version 14.6.0 Release 14)"; ETSI TS 129 214 V14.6.0 (Jan. 2018); pp. 1-85.

International Search Report and Written Opinion in corresponding International Application No. PCT/US2018/067828, dated Apr. 29, 2019, 12 pages.

Technical Specification, "3rd Generation Partnership Project; Technical Specification Group Services and System Aspects; Procedures for the 5G System; Stage 2 (Release 15)", 3GPP TS 23.502 V1.3.0, Nov. 2017, 215 pages.

Technical Specification, "3rd Generation Partnership Project; Technical Specification Group Services and System Aspects; Architecture enhancements to facilitate communications with packet data networks and applications (Release 15)", 3GPP TS 23.682 V15.2.0, Sep. 2017, 122 pages.

3GPP, "3rd Generation Partnership Program; Technical Specification Group Services and Systems Aspects; General Packet Radio Services (GPRS) enhancements for Evolved Universal Terrestrial Radio Access Network", 3GPP TS 23.401, V15.1.0 (Sep. 2017), pp. 1-397.

Nokia, "Nokia showcases 3GPP-compliant Network Exposure Function for 5G Core at Bengaluru Innovation Day", Nov. 29, 2018, 6 pages.

InterDigital, Inc., "InterDigital Extends Term of Joint Venture and Enters Into Patent License Agreement With Sony Corporation of America", Dec. 24, 2018, 3 pages.

Brown, Gabriel et al., "Service-Oriented 5G Core Networks", Huawei Technologies Co. Ltd., Feb. 2017, 10 pages.

Kddi et al., "Update of NEF service for background data transfer", SA WG2 Meeting #126, S2-181504, Feb. 25-Mar. 2, 2018, 5 pages.

Berthoumieux, Didier et al., "Nokia Position statement W3C Workshop on Web5G", May 10-11, 2018, 2 pages.

Starsinic, Michael et al., "An Overview of 3GPP Exposed Services for IoT Service Platforms", InterDigital Communications, USA, vol. 22, Issue 2, Jun. 2018, 6 pages.

Ericsson, "Cellular IoT in the 5G era", GFMC-20:000025 Uen, Feb. 2020, 17 pages.

Mladin, Catalina et al., "Background Data Transfer", oneM2M Partners, Feb. 13, 2017, 10 pages.

\* cited by examiner

POLICY ENFORCEMENT METHODS AND APPARATUS FOR BACKGROUND DATA TRANSFERS INVOLVING MULTIPLE UES

TECHNICAL FIELD

The present disclosure relates generally to policy enforcement methods and apparatus for background data transfers involving multiple user equipments (UEs) in a mobile network.

BACKGROUND

There is a need for policy enforcement methods and apparatus for background data transfers involving multiple user equipments (UEs) (e.g. lightweight machine-to-machine or "LWM2M" devices) in a mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
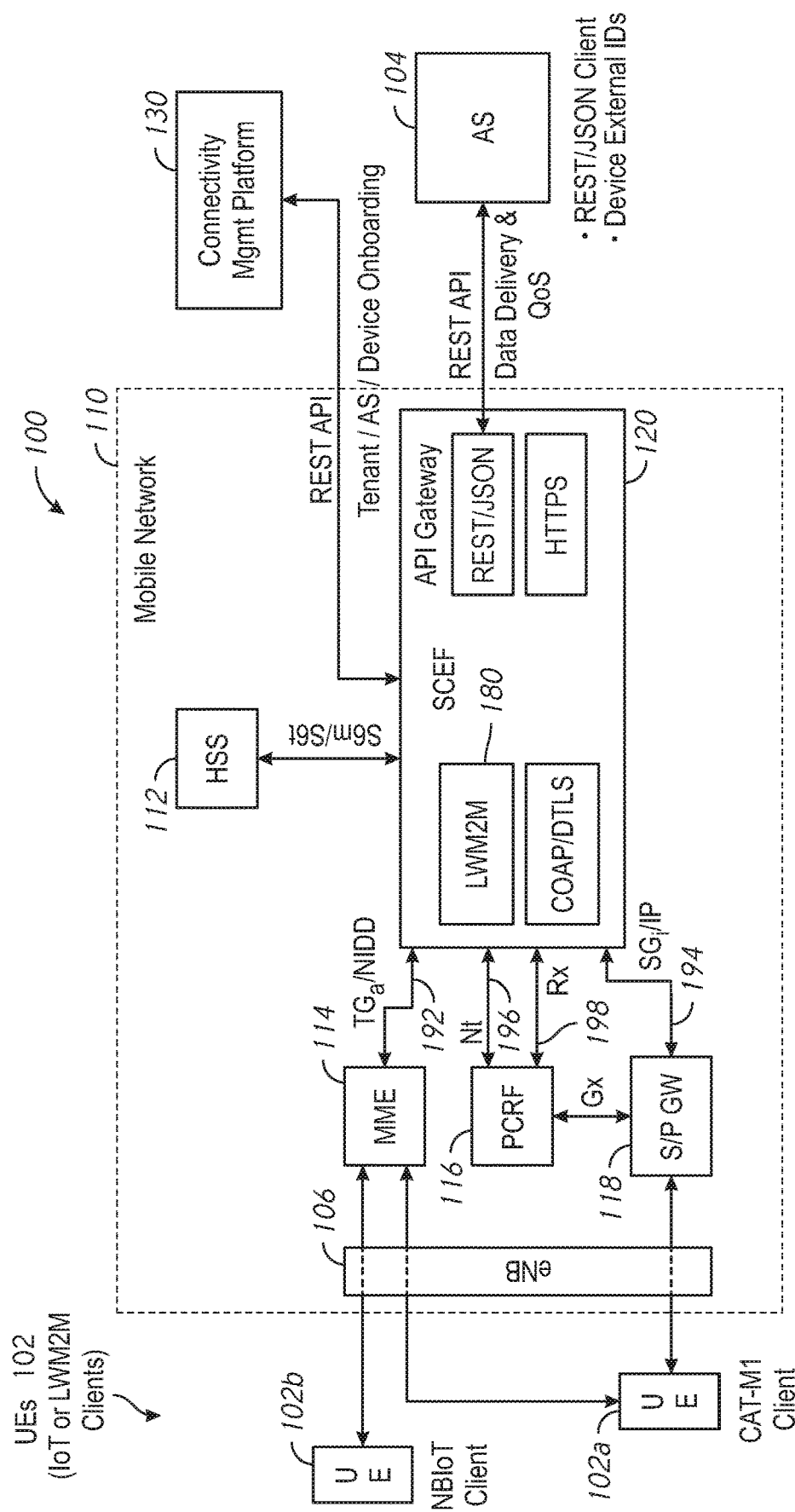
FIG. 1 is an illustrative representation of a communication system which includes a mobile network within which techniques of the present disclosure may be embodied.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Policy enforcement methods and apparatus for background data transfers involving multiple user equipments (UEs) (e.g. lightweight machine-to-machine or "LWM2M" devices) are described herein.

In one illustrative example, policy enforcement may be performed at a network node configured for exposure of services and capabilities, such as a service and capability exposure function (SCEF) of a 4G, Long Term Evolution (LTE) based network, or a network exposure function (NEF) of a 5G mobile network.

In the technique, the network node may receive a message which includes a request for background data transfer from an application server (AS) to a plurality of UEs of a group. The message may include mobile-terminated (MT) data to be delivered, a group ID associated with the group, a total bandwidth for the background data transfer for the group, and a transfer policy ID associated with transfer policy data. The network node may be configured to facilitate the background data transfer associated with the request from the AS, as well as perform policy enforcement for the background data transfer for the group according to the transfer policy. More specifically, the network node may verify whether a current time is within a predefined time window indicated in the transfer policy data. If the current time is not within the predefined time window, then the network node may refrain from proceeding with the background data transfer. If the current time is within the predefined time window, then the network node may proceed and verify whether the total bandwidth for background data transfer for the group is within a predefined aggregate bandwidth limit indicated in the transfer policy data. If the total bandwidth is within the predefined aggregate bandwidth limit, the network node may cause the MT data may be sent to each one of the plurality of UEs associated with the group ID. On the other hand, if the predefined aggregate bandwidth limit would be exceeded, the network node may refrain from sending the background data to the UEs (e.g. a message with a suitable indication of non-delivery may be returned to the AS).

In some implementations, the network node is configured to facilitate background data transfers and perform policy enforcement for communications involving both IP data delivery and non-IP data delivery (NIDD).

More detailed and alternative techniques and implementations are provided herein as described below.

EXAMPLE EMBODIMENTS

FIG. 1 is an illustrative representation of a communication system 100 which includes a mobile network 110. In FIG. 1, mobile network 110 is shown as a Fourth generation (4G), Long Term Evolution (LTE) based mobile network. Mobile network 110 includes a plurality of network nodes or entities, such as a home subscriber server (HSS) 112, a mobility management entity (MME) 114, a policy and charging rules function (PCRF) 116, and a serving/packet data network (S/P) gateway (S/P GW) 118. Also included in communication system 100 may be a connectivity management platform 130.

A service and capability exposure function (SCEF) 120 of the mobile network 110 is one type of network node configured for exposure of services and capabilities of the mobile network 110, for interfacing with application servers (e.g. an application server or AS 104) for communicating data between AS 104 and a plurality of UEs 102. SCEF 120 may interface with one or more MME entities (e.g. MME 114) for non-IP data delivery (NIDD), and one or more S/P GW entities (e.g. S/P GW 118) and one or more PCRFs entities (e.g. PCRF 116) for IP data delivery. Thus, a first mobile network route for data communication makes use of a T6a interface 192 for NIDD, and a second mobile network route for data communication makes use of a SGi interface 194 which terminates at SCEF 120 for IP data delivery. In preferred implementations, SCEF 120 is an enhanced SCEF (eSCEF) described in 3GPP TS 23.682 specifications.

UEs 102 may access mobile network 110 via one or more base stations, such as an eNodeB (eNB) 106. UEs 102 may include lightweight machine-to-machine (LWM2M) devices, such as a UE 102a which is a CAT-M1 device and a UE 102b which is a Narrowband (NB) IoT device. SCEF 120 may include a LWM2M server 180 configured for use with UEs that are LWM2M clients.

General processing associated with CAT-M1 devices (e.g. UE 102a) and NB-IoT devices (e.g. UE 102b) are now briefly discussed. UE 102a, which is a CAT-M1 device, is configured to support IP data delivery for wideband (WB) data communication, as well as NIDD for narrowband (NB) data communication. SCEF 120 may become aware when UE 102a connects to mobile network 110 via the PCRF/SCEF interface. At this time, SCEF 120 may create a context for UE 102a which includes its IP address as an identity. For mobile-terminated (MT) data to be delivered to UE 102a, given the creation of the UE context, SCEF 120 may send MT data from AS 104 to UE 102a via S/P-GW 118 over the SGi interface 194. Note that AS 102 may not even be aware how MT data is delivered to UE 102a (i.e. whether over the SGi interface 194 for IP data delivery or the T6a interface 192 for NIDD).

On the other hand, NB IoT is a Low Power Wide Area Network (LPWAN) radio technology developed to enable a wide range of devices and services to be utilized in cellular bands. An NB IoT device, such as UE 102b, is a constrained device that is not configured to support IP data delivery; rather, NB IoT devices are configured to support NIDD for NB data communication. For NIDD, AS 104 may initiate a procedure that triggers an NIDD configuration procedure between SCEF 120 and HSS 112. As a result of the procedure, an HSS record of UE 102b indicates that 120 will handle the connection to the access point name (APN). This information may be sent to MME 114 as part of the attachment procedure. MME 114 may initiate a T6a session establishment to SCEF 120. MT data for delivery to UE 102b may be sent over the T6a interface 192 to MME 114 based on the UE context (and/or session record) created when the T6a session establishment is performed.

Figure 2:
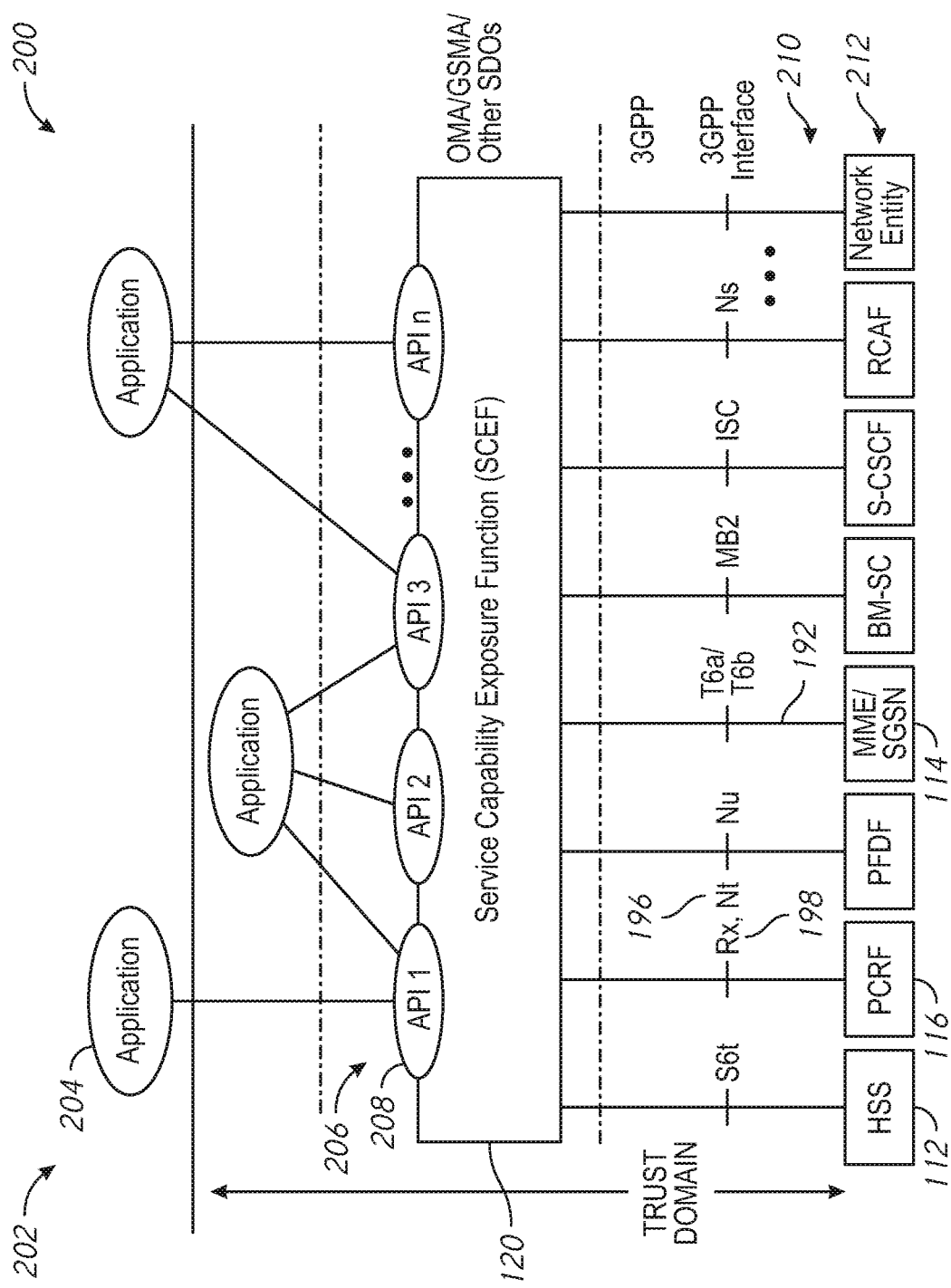
FIG. 2 is an illustrative representation of a reference architecture of a service and capability exposure function (SCEF) of the mobile network of FIG. 1.

FIG. 2 is a basic illustrative representation of SCEF reference architecture 200 of SCEF 120. The basis for SCEF reference architecture 200 of FIG. 2 may be found in $3^{rd}$ Generation Partnership Project (3GPP) Technical Specification (TS) 23.682 (i.e. 3GPP TS 23.682). In SCEF reference architecture 200, SCEF 120 is shown to include one or more application programming interfaces (APIs) 206 (such as an API 208) for one or more applications 202 (such as an application 204) of the application servers. The one or more applications 202 may include third-party applications for third-part application servers. A plurality of 3GPP interfaces 210 are defined between SCEF 120 and a plurality of other network entities 212 in the mobile network. 3GPP interfaces relevant to techniques of the present disclosure include the T6a interface 192 for interfacing with MME 114, and Nt and Tx interfaces 196 and 198 for interfacing with PCRF 116.

Again, SCEF 120 is one type of network node configured for exposure of services and capabilities of mobile network 110, as well as for interfacing with application servers for communication of data via the mobile network 110. Another type of network node configured for exposure of services and capabilities of a mobile network is a network exposure function (NEF) node of a 5G mobile network. Here, in some implementations, the NEF may interface with one or more access and mobility management (AMF) entities for NIDD, and/or one or more user plane functions (UPF) entities and one or more policy control function (PCF) entities for IP data delivery.

Figure 3:
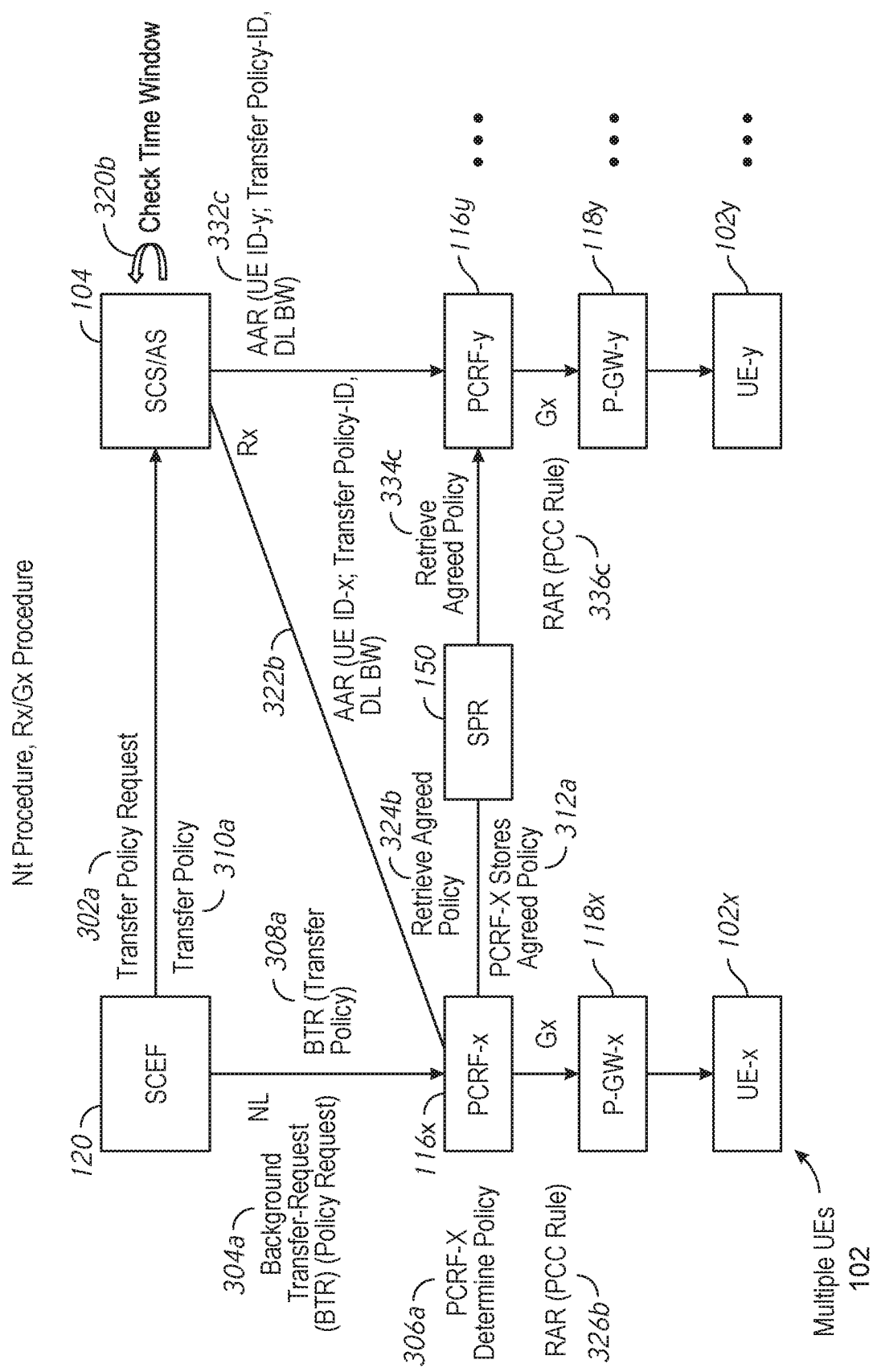
FIG. 3 is a process flow diagram for use in describing an Nt procedure for obtaining a transfer policy and Rx/Gx procedures for policy enforcement for UEs.

FIG. 3 is a process flow diagram 300 including an illustrative representation of relevant network nodes, for describing an Nt procedure for obtaining a transfer policy between an AS and a PCRF (via the SCEF) as well as Rx/Gx procedures for enforcement of the transfer policy for UEs according to existing standards.

The Nt procedure is generally described in 3GPP TS 23.682. In FIG. 3, AS 104 which includes a service capability server (SCS) may send to SCEF 120 a message which includes a transfer policy request (step 302a of FIG. 3). In response, SCEF 120 may send a message which includes background transfer request (BTR) to the appropriate PCRF (e.g. PCRF 116x) (step 304a of FIG. 3). A transfer policy may be negotiated and determined at the PCRF 116x (step 306a of FIG. 3). The transfer policy agreed to between AS 104 and the PCRF may have the following attributes:

{Transfer-Policy-Id}
{Time-Window}
{Rating-Group}
{Max-Requested-Bandwidth-DL}
{Max-Requested-Bandwidth-UL}
*{AVP}

PCRF 116x may send the transfer policy to SCEF 120 (step 308a of FIG. 3), which in turn may send the transfer policy to the AS 104 for storage (step 310a of FIG. 3). PCRF 116x may store the transfer policy in a subscription profile repository (SPR) 150 for later retrieval (step 312a of FIG. 3).

The Rx/Gx procedures for policy enforcement for background data transfer to UEs are now generally described. In FIG. 3, AS 104 which has the stored transfer policy may check when a current time matches a beginning of the predefined time window indicated in the transfer policy data (step 320b of FIG. 3). When the current time matches the beginning of the predefined time window, AS 104 may proceed with policy enforcement by sending a message which includes an authorize/authenticate request (AAR) (i.e. a QoS authorization request) over the Rx interface to the appropriate PCRF (e.g. PCRF 116x) assigned to a UE (e.g. UE 102x) (step 322b of FIG. 3). The message may include a UE ID, a transfer policy ID, and a downlink bandwidth. PCRF 116x may retrieve the transfer policy based on the transfer policy ID (step 324b of FIG. 3), and determine and install one or more policy and charging control (PCC) rules at the appropriate PGW (e.g. PGW 118x) over the Gx interface using a re-authorize request (RAR) (step 326b of FIG. 3). The above-described steps may be repeated for one or more additional UEs of the group, where AS 104 sends a message which includes an AAR to the appropriate PCRF (e.g. PCRF 116y) assigned to the UE (e.g. UE 102y) (step 332c of FIG. 3), where the PCRF may in turn obtain the transfer policy based on the transfer policy ID (step 334c of FIG. 3) and determine and install one or more PCC rules at the appropriate PGW (e.g. P-GW 118y) over the Gx interface using a RAR (step 336c of FIG. 3). As is apparent from the above, there is no enforcement of an aggregate QoS for the multiple UEs.

Figure 4:
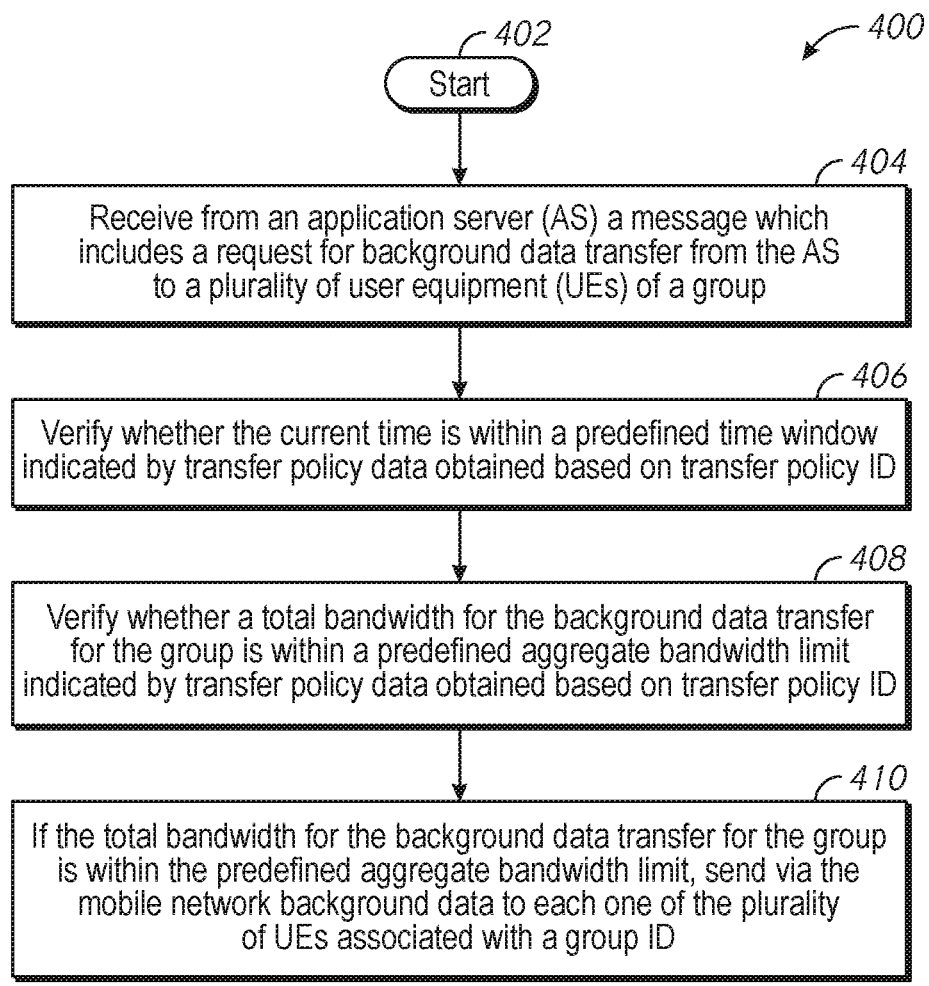
FIG. 4 is a flowchart for describing an example method for use in policy enforcement for a background data transfer involving multiple UEs according to some implementations of the present disclosure, where the multiple UEs are a plurality of UEs of a group identified by a group ID.

FIG. 4 is a flowchart 400 for describing a basic example method for use in policy enforcement for a background data transfer involving multiple UEs according to some implementations of the present disclosure. In the example of FIG. 4, the background data transfer may be for mobile-terminated (MT) data to a plurality of UEs of a predefined group. The method of FIG. 4 may be embodied in and/or performed by a network node configured for exposure of services and capabilities of a mobile network (e.g. an SCEF or NEF). The method may be executed on a server, network device, or network equipment in the mobile network. The network node may include a lightweight machine-to-machine (LWM2M) server configured for use with UEs comprising LWM2M clients. The method may be further embodied as a computer program product including a non-transitory computer readable medium and instructions stored in the computer readable medium where the instructions are executable on one or more processors of the server, network device, or network equipment for performing the steps of the method.

Beginning at a start block 402 of FIG. 4, the network node (e.g. the SCEF) may receive from the AS a message which includes a request for background data transfer from the AS to the plurality of UEs of the group (step 404 of FIG. 4). In some implementations, the message may include a group ID associated with the group, a total bandwidth for the background data transfer for the group, a transfer policy ID associated with transfer policy data, and the MT data being delivered.

The network node may perform policy enforcement for the background data transfer. The transfer policy data may be obtained by the network node based on the received transfer policy ID. Here, the network node may verify whether a current time is within a predefined time window indicated in the transfer policy data (step 406 of FIG. 4). If the current time is not within the predefined time window, then the network node may refrain from performing the background data transfer. If the current time is within the predefined time window, then the network node may proceed to verify whether the total bandwidth for the background data transfer for the group is within a predefined aggregate bandwidth limit indicated in the transfer policy data (step 408 of FIG. 4).

If the total bandwidth for the background data transfer for the group is within the predefined aggregate bandwidth limit, then the network node may send via the mobile network the background data to each one of the plurality of UEs associated with the group ID (step 410 of FIG. 4). On the other hand, if the total bandwidth for the background data transfer for the group would exceed the predefined aggregate bandwidth limit, then the network node may refrain from sending the background data to the UEs (e.g. a message with a suitable indication of non-delivery may be returned to the AS).

In step 410, the background data may be transferred using non-IP data delivery (NIDD) or IP data delivery, depending on the types of UEs. Using NIDD, UEs may be assigned to different CP entities for mobility management (e.g. for communication over the T6a interface). The CP entity for mobility management may be a mobility management entity (MME) or an access and mobility management function (AMF). Here, for each one of the UEs of the group, the network node may retrieve an identity of the CP entity for mobility management assigned to the UE, and send the background data from the AS to the UE via the CP entity for mobility management identified by the retrieved identity.

Using IP data delivery, UEs may be assigned to different UP entities for carrying data traffic (e.g. for communication over the SGi interface). The UP entity may be a PDN GW (PGW) or a user plane function (UPF). Here, for each one of the UEs of the group, the network node may retrieve an identity of the UP entity assigned to the UE, and send the background data from the AS to the UE via the UP entity identified by the retrieved identity. Prior to the sending of MT data, the network node may send, to a CP entity for policy control, a message which includes a quality of service (QoS) authorization request. The CP entity for policy control may be a policy and charging rules function (PCRF) or a policy control function (PCF). The QoS authorization request may indicate a bandwidth limit for the background data transfer for the individual UE, where the CP entity for policy control is enabled to provision and/or activate one or more rules at a CP entity for policy enforcement, to enforce the per-UE bandwidth limit at the UP entity.

Figure 5:
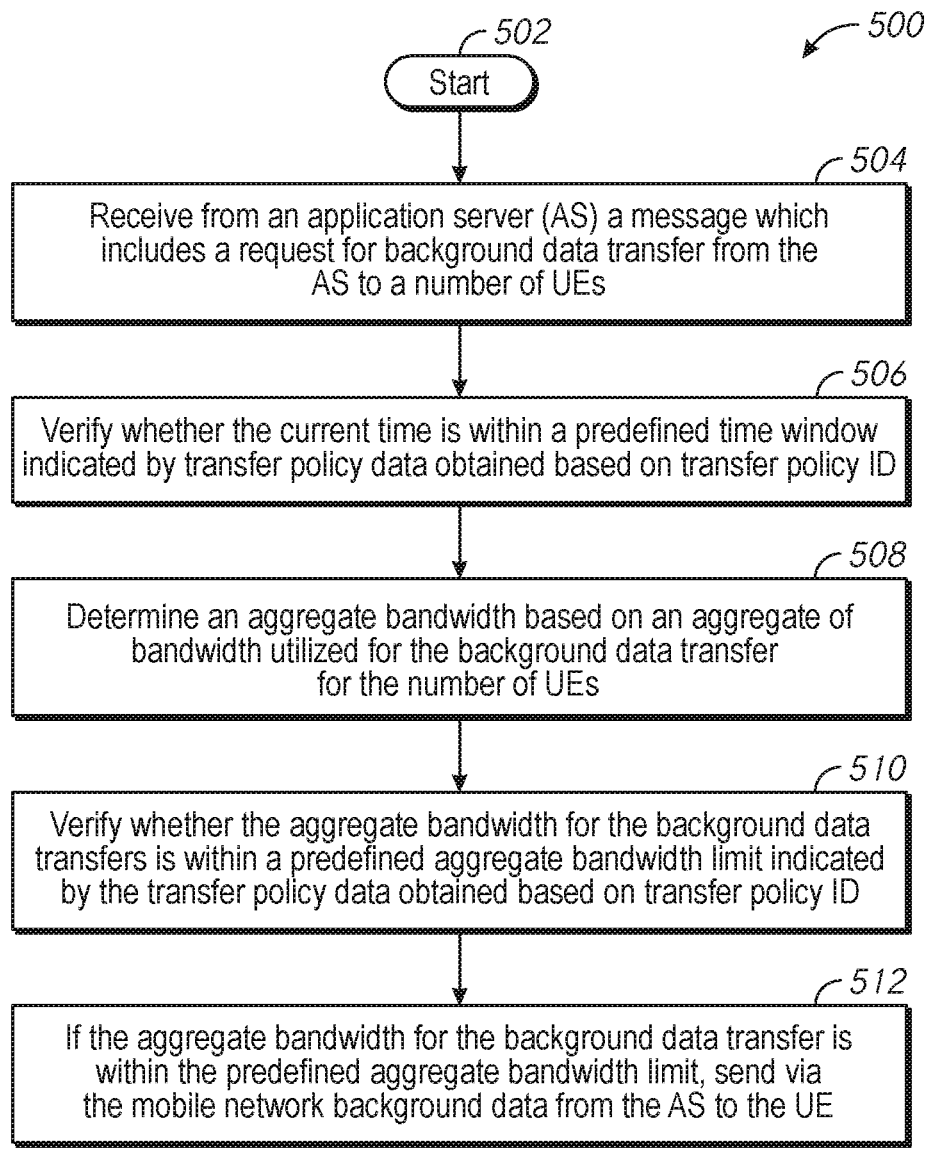
FIG. 5 is a flowchart for describing an example method for use in policy enforcement for a background data transfer involving multiple UEs according to some implementations of the present disclosure, which is performed on a per-UE basis.

FIG. 5 is a flowchart 500 for describing another basic example method for use in policy enforcement for background data transfer involving multiple UEs according to some implementations of the present disclosure. In this example, the background data transfer is for MT data and performed on a per-UE basis. The method of FIG. 5 may be embodied in and/or performed by a network node configured for exposure of services and capabilities of a mobile network (e.g. an SCEF or NEF). The method may be executed on a server, network device, or network equipment in the mobile network. The network node may include a LWM2M server configured for use with UEs comprising LWM2M clients. The method may be further embodied as a computer program product including a non-transitory computer readable medium and instructions stored in the computer readable medium where the instructions are executable on one or more processors of the server, network device, or network equipment for performing the steps of the method.

Beginning at a start block 502 of FIG. 5, the network node (e.g. the SCEF) may receive from the AS a message which includes a request for background data transfer from the AS to a number of UEs (step 504 of FIG. 5). In some implementations, the message may include the MT data being transferred, a plurality of UE IDs associated with the number of UE, and a transfer policy ID associated with transfer policy data. The message may further include the bandwidth of the MT data being transferred per-UE or, alternatively, the aggregate bandwidth of MT data being transferred for all of the UEs.

The network node may perform policy enforcement for the background data transfer. The transfer policy data may be obtained by the network node based on the received transfer policy ID. Here, the network node may verify whether a current time is within a predefined time window indicated in the transfer policy data (step 506 of FIG. 5). If the current time is not within the predefined time window, then the network node may refrain from proceeding with the transfer. If the current time is within the predefined time window, the network node may determine an aggregate bandwidth for the background data transfer to the number of UEs (step 508 of FIG. 5). The calculation performed in step 508 may be based on the product of the bandwidth of the MT data per-UE and the number of UEs involved in the background data transfer. If the initial request of step 504 included the aggregate bandwidth, step 508 may be skipped or omitted.

The network node may then verify whether the aggregate bandwidth is within a predefined aggregate bandwidth limit indicated in the transfer policy data (step 510 of FIG. 5). If the aggregate bandwidth utilized for the background data transfers within the predefined time window is within the predefined aggregate bandwidth limit, then the network node may cause the background data to be sent to each one of the UEs via the mobile network (step 512 of FIG. 5). On the other hand, if the aggregate bandwidth utilized for the background data transfers would exceed the predefined aggregate bandwidth limit, then the network node may refrain from causing the background data to be sent to the UEs (e.g. a message with a suitable indication of non-delivery may be returned to the AS).

In step 512, the background data may be transferred using NIDD or IP data delivery, depending on the type of UE. Using NIDD, UEs may be assigned to different CP entities for mobility management (e.g. for communication via the T6a interface). The CP entity for mobility management may be an MME or AMF. Here, the network node may retrieve an identity of the CP entity for mobility management assigned to the UE and send the background data from the AS to the UE via the CP entity for mobility management identified by the retrieved identity.

Using IP data delivery, UEs may be assigned to different UP entities for carrying data traffic (e.g. for communication via the SGi interface). The UP entity may be a PGW or a UPF. Here, the network node may retrieve an identity of the UP entity assigned to the UE, and send the background data from the AS to the UE via the UP entity identified by the retrieved identity. Prior to the sending of MT data, the network node may send, to a CP entity for policy control, a message which includes a QoS authorization request. The CP entity for policy control may be a PCRF or a PCF. The QoS authorization request may include a bandwidth limit for the background data transfer for the individual UE, where the CP entity for policy control is enabled to provision and/or activate one or more rules at a CP entity for policy enforcement, to enforce the per-UE bandwidth limit at the UP entity.

Figure 6:
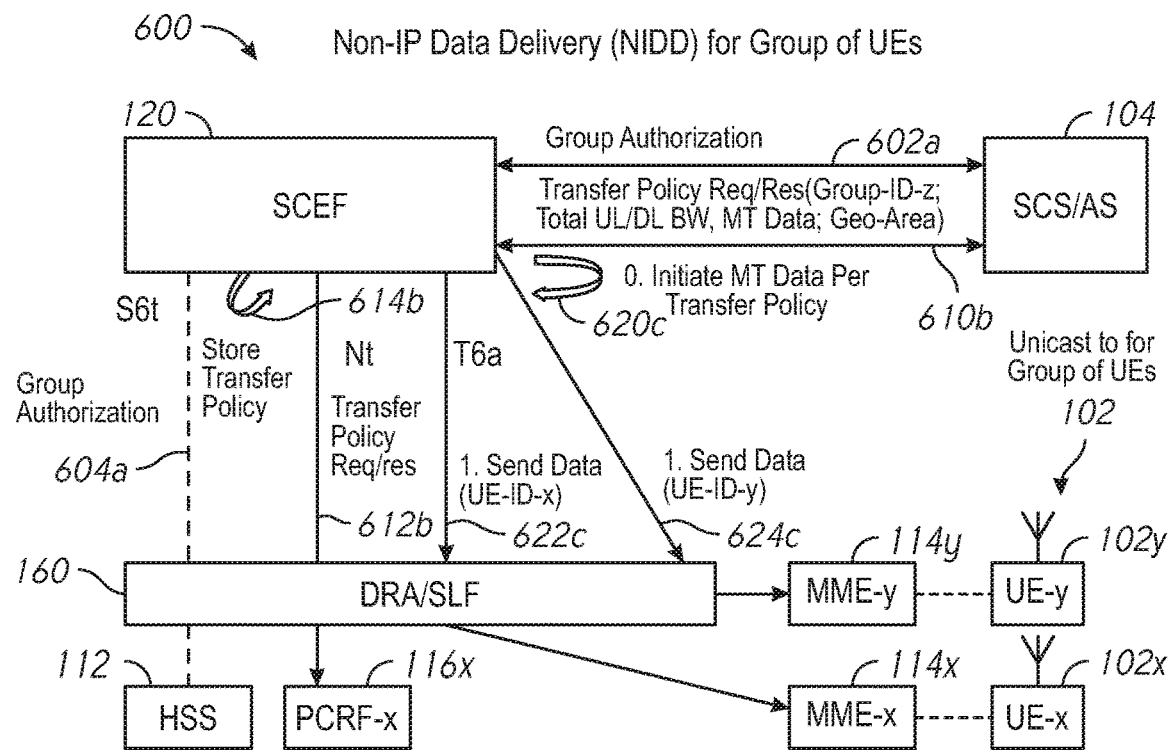
FIG. 6 is a process flow diagram for describing policy enforcement for background data transfer between an AS and multiple UEs according to some implementations of the present disclosure, where the background data transfer involves mobile-terminated (MT) data for non-IP data delivery (NIDD) to a plurality of UEs of a group identified by a group ID.

FIG. 6 is a process flow diagram 600 including an illustrative representation of relevant network nodes for describing policy enforcement for background data transfer between an AS and multiple UEs. In this example, the background data comprises mobile-terminated (MT) data for non-IP data delivery (NIDD) to a plurality of UEs of a group associated with a group ID. Each group of UEs may be configured and/or provisioned at the SCEF 120, HSS 112, and/or AS 104. In some implementations, HSS 112 may store a group ID in association with a plurality of UE IDs corresponding to the plurality of UEs of the group, along with subscription and/or subscriber data. The group ID may also be stored in association with the plurality of UE IDs at the AS 104.

Initially, AS 104 may send to SCEF 120 a message indicating a request for authorization for communications involving the group of UEs (step 602a of FIG. 6). In response to receiving the request, SCEF 120 may perform authorization for the communications involving the group, consulting with information from HSS 122 based on the group ID (step 604a of FIG. 6). Upon successful group authentication, AS 104 may send to SCEF 120 a message indicating a transfer policy request associated with a background data transfer (step 610b of FIG. 6). The message may include the group ID associated with the group, a total uplink (UL) and/or downlink (DL) bandwidth, the MT data to be delivered, and a geo-area associated with the communications. In response to receiving the message, SCEF 120 may perform a procedure for requesting and receiving a transfer policy (step 612b of FIG. 6). The procedure may be or include steps of an Nt procedure between SCEF 120 and an appropriate PCRF (e.g. PCRF 116x). SCEF 120 may store the transfer policy in association with its transfer policy ID (step 614b of FIG. 6). The transfer policy may include transfer policy data which includes a predefined time window within which background data may be communicated between the AS 104 and the group of UEs, and a predefined aggregate bandwidth limit (for UL and/or DL data) for the background data transfer within the predefined time window.

SCEF 120 is configured to facilitate the background data transfer associated with the request from AS 104, as well as perform policy enforcement for the background data transfer according to the transfer policy. SCEF 120 may obtain the transfer policy data based on the stored transfer policy ID. In some implementations, AS 104 may initiate the procedure for the background data transfer in response to detecting the beginning of (or some reasonable time within) the predefined time window (step 620c of FIG. 6). If multiple requests exist at the same time, AS 104 may queue one or more requests for subsequent processing.

SCEF 120 may verify whether the total bandwidth is within the predefined aggregate bandwidth limit indicated in the obtained transfer policy data. If the total bandwidth for the background data transfer is within the predefined aggregate bandwidth limit, then SCEF 120 may proceed with the transfer. On the other hand, if the total bandwidth would exceed the predefined aggregate bandwidth limit, SCEF 120 may refrain from sending the background data to the group of UEs (e.g. SCEF 120 may send to AS 104 a message with a suitable indication of non-delivery).

In the background data transfer, SCEF 120 may send MT data to each one of the plurality of UEs (e.g. UEs 102x and 102y of FIG. 6) of the group according to NIDD (step 622c, step 624*c*, etc. of FIG. 6). The background data transfer to the group of UEs may be viewed as a series of unicast data deliveries to the UEs. Here SCEF 120 may obtain the plurality of UE IDs stored in association with the group ID, and identify which UEs associated with these UE IDs are registered or attached to the mobile network. For each registered UE, SCEF 120 may identify which MME (e.g. MME 114*x* or 114*y* of FIG. 6) in the mobile network is assigned to the UE (i.e. an identity of the MME is stored in association with the registered UE ID), and send the MT data to the UE via the identified MME over the T6x interface. The sending of the MT data may be performed via the DRA/SLF 160.

Figure 7:
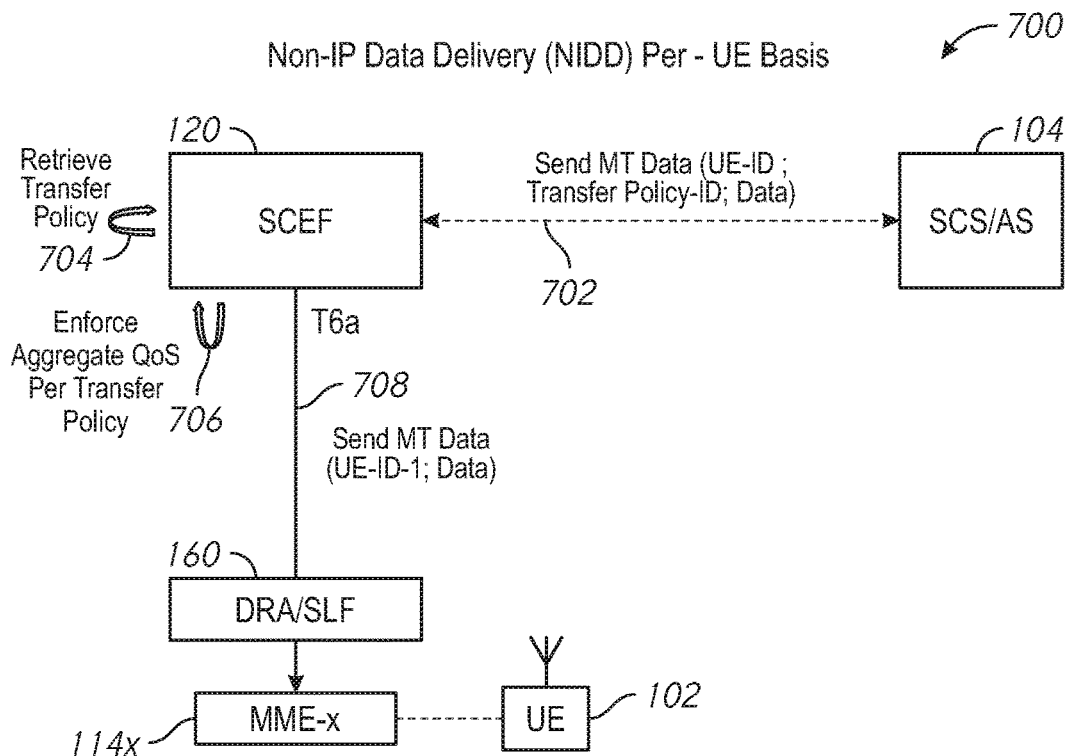
FIG. 7 is a process flow diagram for describing policy enforcement for background data transfer between an AS and multiple UEs according to some implementations of the present disclosure, where the background data transfer involves MT data for NIDD performed on a per-UE basis.

FIG. 7 is a process flow diagram 700 including an illustrative representation of relevant network nodes for describing policy enforcement for background data transfer between an AS and multiple UEs. In this example, the background data comprises MT data for NIDD and the transfer is performed on a per-UE basis. In preferred implementations of this method, configuration and/or provisioning of the UEs at the SCEF 120, HSS 112, and/or AS 104 may be not be necessary and therefore omitted.

Initially, AS 104 may send to SCEF 120 a message indicating a transfer policy request for obtaining a transfer policy. In response to receiving the message, SCEF 120 may perform a procedure for requesting and receiving a transfer policy. The procedure may be or include steps of an Nt procedure between SCEF 120 and a PCRF. SCEF 120 may store the transfer policy in association with its transfer policy ID (step 704 of FIG. 7). The transfer policy may include transfer policy data which includes a predefined time window within which background data may be communicated between the AS 104 and UEs, and a predefined aggregate bandwidth limit (for UL and/or DL data) for background data transfers within the predefined time window.

SCEF 120 is configured to facilitate the background data transfer for requests from AS 104 and perform policy enforcement associated therewith for a number of UEs. AS 104 may send to SCEF 120 a message indicating a request for background data transfer for the UEs. The message may include the MT data to be delivered, a plurality of UE IDs associated with the number of UEs, and a transfer policy ID associated with a transfer policy. The message may further include the QoS/bandwidth of the MT data being transferred per-UE, or alternatively, the aggregate QoS/bandwidth of MT data being transferred for all of the UEs. If the request includes the QoS/bandwidth of the MT data per UE, the SCEF 120 may determine an actual aggregate bandwidth utilized for the background data transfer for all of the UEs. The calculation performed here may be based on the product of the bandwidth of the MT data per-UE and the number of UEs involved in the background data transfer.

SCEF 120 may obtain the transfer policy data based on the stored transfer policy ID. The transfer policy data may include a predefined aggregate bandwidth limit. SCEF 120 may enforce the aggregate QoS/bandwidth according to the obtained transfer policy data (step 706 of FIG. 7). If the actual aggregate bandwidth for the background data transfer is within the predefined aggregate bandwidth limit, then SCEF 120 may proceed with the data transfer. On the other hand, if the actual aggregate bandwidth would exceed the predefined aggregate bandwidth limit, SCEF 120 may refrain from proceeding with the data transfer (e.g. SCEF 120 may send to AS 104 a message with a suitable indication of non-delivery).

For the background data transfer, SCEF 120 may send MT data to the UEs according to NIDD (step 708 of FIG. 7). For each UE, SCEF 120 may identify which MME (e.g. MME 114*x*) in the mobile network is assigned to the UE (note that an identity of the MME is stored in association with the registered UE ID), and send the MT data to the UE via the identified MME over the T6x interface. The sending of the MT data may be performed via the DRA/SLF 160.

Figure 8:
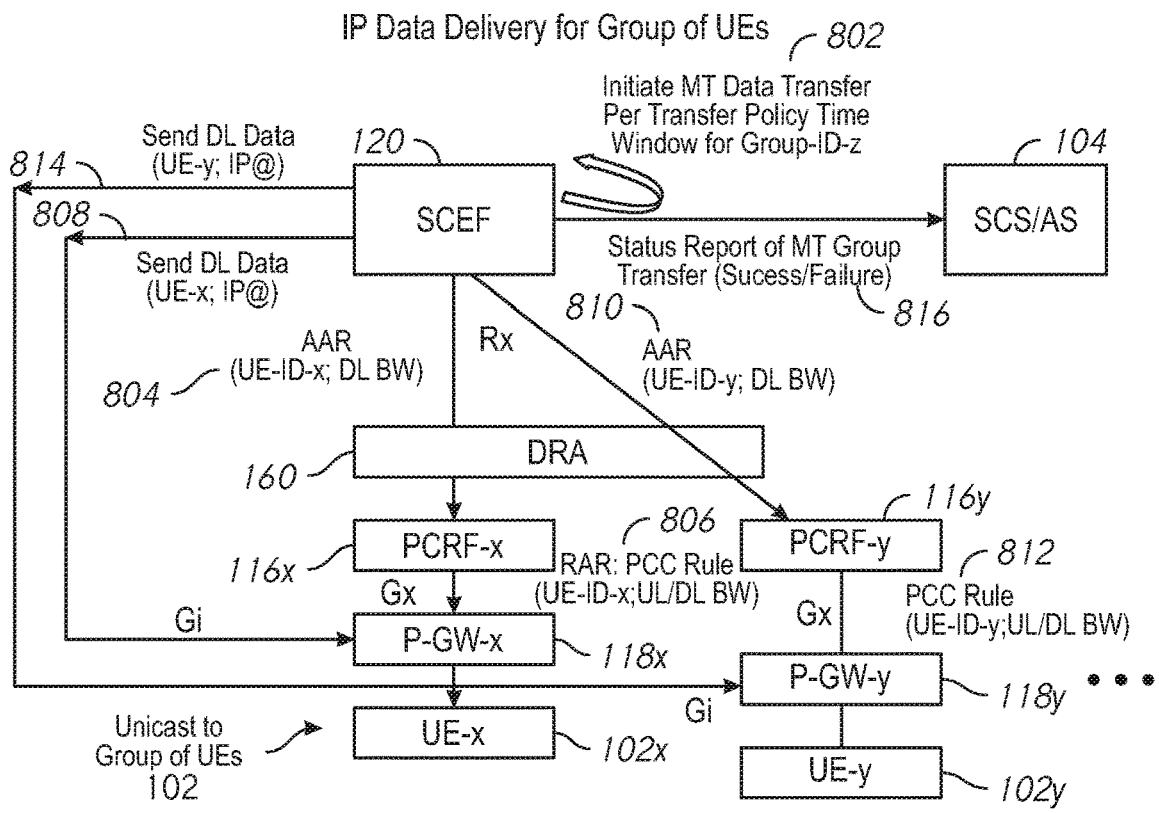
FIG. 8 is a process flow diagram for describing policy enforcement for background data transfer between an AS and multiple UEs according to some implementations of the present disclosure, where the background data transfer involves MT data for IP data delivery to a plurality of UEs of a group identified by a group ID.

FIG. 8 is a process flow diagram 800 including an illustrative representation of relevant network nodes for describing policy enforcement for background data transfer between an AS and multiple UEs. In this example, the background data comprises MT data for IP data delivery to a plurality of UEs of a group associated with a group ID. Each group of UEs may be configured and/or provisioned at the SCEF 120 and/or AS 104. In some implementations, SCEF 120 may store the group ID in association with a plurality of UE IDs corresponding to the plurality of UEs of the group. The group ID may also be stored in association with the plurality of UE IDs at the AS 104.

Initially, AS 104 may send to SCEF 120 a message indicating a transfer policy request associated with a background data transfer. The message may include the group ID associated with the group, a total uplink (UL) and/or downlink (DL) bandwidth, the MT data to be delivered, and a geo-area associated with the communications. In response to receiving the message, SCEF 120 may perform a procedure for requesting and receiving a transfer policy. The procedure may be or include steps of an Nt procedure between SCEF 120 and a PCRF (e.g. PCRF 116*x*). SCEF 120 may store the transfer policy in association with its transfer policy ID. The transfer policy may include transfer policy data which includes a predefined time window within which background data may be communicated between the AS 104 and the group of UEs, and a predefined aggregate bandwidth limit (for UL and/or DL data) for the background data transfer within the predefined time window.

Thus, SCEF 120 is configured to facilitate the background data transfer associated with the request from AS 104, as well as perform policy enforcement for the background data transfer according to the transfer policy. For the background data transfer, SCEF 120 may obtain the transfer policy data based on the stored transfer policy ID. In some implementations, AS 104 may initiate the procedure for the background data transfer in response to detecting the beginning of (or some reasonable time within) the predefined time window (step 802 of FIG. 8). If multiple requests exist at the same time, AS 104 may queue one or more requests for the subsequent processing.

SCEF 120 may verify whether the total bandwidth is within the predefined aggregate bandwidth limit indicated in the obtained transfer policy data. If the total bandwidth for the background data transfer is within the predefined aggregate bandwidth limit, then SCEF 120 may proceed with the transfer. On the other hand, if the total bandwidth would exceed the predefined aggregate bandwidth limit, SCEF 120 may refrain from sending the background data to the group of UEs (e.g. SCEF 120 may send to AS 104 a message with a suitable indication of non-delivery).

Each one of the UEs of the group may be attached to the mobile network, and assigned with a PCRF, a P-GW, and an IP address. For each UE, SCEF 120 may be notified of the UE attachment, and store an identity of the assigned PCRF, an identity of the assigned P-GW, and the assigned IP address in association with the UE ID of the UE. SCEF 120 may send a message which includes an authorize/authenticate request (AAR) (i.e. a QoS authorization request) to the PCRF (e.g. PCRF 116*x*) assigned to a UE over the Rx interface (e.g. UE 102*x*) (step 804 of FIG. 8). This request may be performed via DRA 160. In turn, the PCRF may determine and install one or more policy and charging control (PCC) rules at the P-GW (e.g. P-GW 118*x*) assigned to the UE using a re-authorize request (RAR) over the Gx interface (step 806 of FIG. 8). This step may be performed per 3GPP 23.203 specifications. The RAR and/or PCC rule may be or include the UE ID of the UE and the UL/DL bandwidth. SCEF 120 may then send the MT data to the P-GW (e.g. P-GW 118) assigned to the UE over the Gi interface, using the UE ID and the assigned IP address (step 808 of FIG. 8).

The above-described steps may be repeated for one or more additional UEs of the group, where SCEF 120 may send a message which includes an AAR to the PCRF (e.g. PCRF 116*y*) assigned to the UE (e.g. UE 102*y*) (step 810 of FIG. 8), where the PCRF in turn determines and installs one or more PCC rules at the P-GW (e.g. P-GW 118*y*) assigned to the UE using a RAR (step 812 of FIG. 8), and send the MT data to the P-GW (e.g. P-GW 118*y*) assigned to the UE over the Gi interface, using the UE ID and the assigned IP address (step 814 of FIG. 8).

Figure 9:
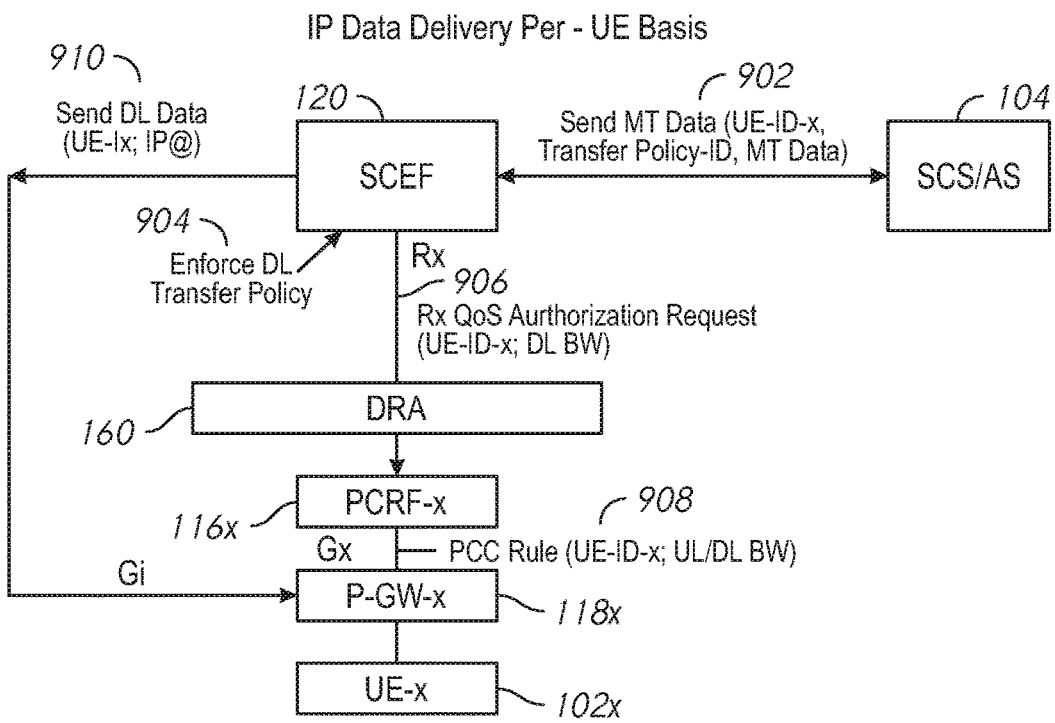
FIG. 9 is a process flow diagram for describing policy enforcement for background data transfer between an AS and multiple UEs according to some implementations of the present disclosure, where the background data transfer involves MT data for IP data delivery performed on a per-UE basis.

FIG. 9 is a process flow diagram 900 including an illustrative representation of relevant network nodes for describing policy enforcement for background data transfer between an AS and multiple UEs. In this example, the background data comprises MT data for IP delivery and the transfer is performed on a per-UE basis. In preferred implementations, configuration and/or provisioning for the plurality of UEs at SCEF 120, HSS 112, and/or AS 104 may not be necessary and therefore omitted.

Initially, AS 104 may send to SCEF 10 a message indicating a transfer policy request for obtaining a transfer policy. In response to receiving the message, SCEF 120 may perform a procedure for requesting and receiving a transfer policy. The procedure may be or include steps of an Nt procedure between SCEF 120 and a PCRF (e.g. PCRF 116*x*). SCEF 120 may store the transfer policy in association with its transfer policy ID. The transfer policy may include transfer policy data which includes a predefined time window within which background data may be communicated between the AS 104 and the UEs, and a predefined aggregate bandwidth limit (for UL and/or DL data) for the background data transfers within the predefined time window.

SCEF 120 is configured to facilitate the background data transfer for requests from AS 104 as well as perform policy enforcement associated therewith for a number of UEs. AS 104 may send to SCEF 120 a message indicating a request for background data transfer for the UEs (step 902 of FIG. 9). The message may include the MT data to be delivered, a plurality of UE IDs associated with the number of UEs, and a transfer policy ID associated with a transfer policy. The message may further include the QoS/bandwidth of the MT data being transferred per-UE or, alternatively, the aggregate QoS/bandwidth of MT data being transferred for all of the UEs. If the request includes the QoS/bandwidth of the MT data per UE, the SCEF 120 may determine an actual aggregate bandwidth utilized for the background data transfer for all of the UEs. The calculation performed here may be based on the product of the bandwidth of the MT data per-UE and the number of UEs involved in the background data transfer.

SCEF 120 may obtain the transfer policy data based on the stored transfer policy ID. The transfer policy data may include a predefined aggregate bandwidth limit. SCEF 120 may enforce the aggregate QoS/bandwidth according to the obtained transfer policy data (step 904 of FIG. 9). If the actual aggregate bandwidth for the background data transfer is within the predefined aggregate bandwidth limit, then SCEF 120 may proceed with the data transfer. On the other hand, if the actual aggregate bandwidth would exceed the predefined aggregate bandwidth limit, SCEF 120 may refrain from proceeding with the data transfer (e.g. SCEF 120 may send to AS 104 a message with a suitable indication of non-delivery).

Note that each one of the UEs may be attached to the mobile network, and assigned with a PCRF, a P-GW, and an IP address. For each UE, SCEF 120 may be notified of the UE attachment, and store an identity of the assigned PCRF, an identity of the assigned P-GW, and the assigned IP address in association with the UE ID of the UE. For each UE in the background data transfer, SCEF 120 may send over the Rx interface a message which includes an authorize/authenticate request (AAR) (i.e. a QoS authorization request) to the PCRF (e.g. PCRF 116*x*) assigned to the UE (e.g. UE 102*x*) (step 906 of FIG. 9). This request may be sent via DRA 160. In turn, the PCRF may determine and install via the Gx interface one or more PCC rules at the P-GW (e.g. P-GW 118*x*) assigned to the UE using a RAR (step 908 of FIG. 9). This step may be performed per 3GPP 23.203 specifications. The RAR and/or PCC rule installation may include or be based on the UE ID of the UE and the UL/DL bandwidth. SCEF 120 may then send over the Gi interface the MT data to the P-GW (e.g. P-GW 118*x*) assigned to the UE, using the UE ID and the assigned IP address (step 910 of FIG. 9).

Figure 10:
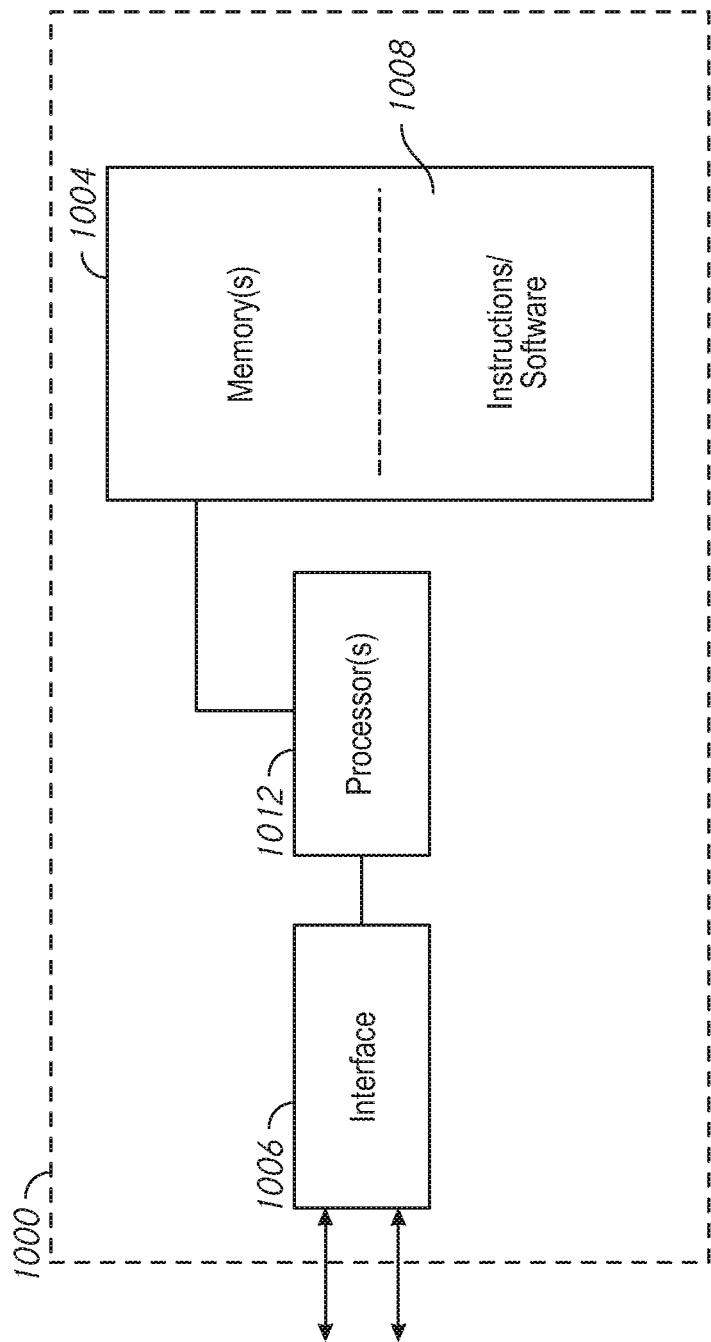
FIG. 10 is an illustrative representation of basic relevant components of a server, network device, network element, or network equipment for use in a mobile network according to some implementations of the present disclosure.

FIG. 10 is an illustrative representation of basic relevant components of a server, network device, network element, or network equipment 1000 for use in a mobile network according to some implementations of the present disclosure. The network equipment 1000 may be for an SCEF or NEF as described above. The components may include one or more processors 1012 coupled to one or more memories 1004 and to one or more interfaces 1006. Interface 1006 may be configured to connect to one or more network nodes or networks for communication. The one or more processors 1012 are configured to operate in accordance with program instructions/software 1008 stored in the one or more memories 1004, in order to perform basic operations as well as to perform techniques of the present disclosure. Relatedly, a computer program product may include a non-transitory computer-readable medium (e.g. memory, a computer disk, etc.) and program instructions stored in the non-transitory computer-readable medium such that, when executed by one or more processors 1012, perform the techniques of the present disclosure.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first UE could be termed a second UE, and, similarly, a second UE could be termed a first UE, without changing the meaning of the description, so long as all occurrences of the "first UE" are renamed consistently and all occurrences of the second UE are renamed consistently. The first UE and the second UE are both UEs, but they are not the same UE.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a network node configured for exposure of services and capabilities of a mobile network, and for interfacing with an application server (AS) for communication of data via the mobile network,
   receiving a message which includes a request for background data transfer from the AS to a plurality of UEs of a group, the message including a group ID associated with the group and a transfer policy ID associated with transfer policy data;
   verifying whether a total bandwidth for the background data transfer for the group is within a predefined aggregate bandwidth limit indicated by the transfer policy data obtained based on the transfer policy ID; and
   causing background data from the AS to be sent to each one of the plurality of UEs via the mobile network, if the total bandwidth for the background data transfer for the group is verified to be within the predefined aggregate bandwidth limit, by:
   based on identifying that the request is for background data comprising mobile-terminated data for non-IP data delivery (NIDD), for each one of the UEs, retrieving an identity of a control plane (CP) entity for mobility management assigned to the UE and sending the background data from the AS to the CP entity for mobility management identified by the retrieved identity for delivery of the background data to the UE; and
   based on identifying that the request is for background data comprising mobile-terminated data for IP data delivery, for each one of the UEs, retrieving an identity of a user plane (UP) entity assigned to the UE and sending the background data from the AS to the UP entity identified by the retrieved identity for delivery of the background data to the UE.

2. The method of claim 1, further comprising:
   wherein the network node for exposure of services and capabilities comprises one of a service and capability exposure function (SCEF) or a network exposure function (NEF), and
   wherein the network node is configured for interfacing with the AS with use of an application programming interface (API).

3. The method of claim 1, further comprising:
   wherein the plurality of UEs of the group comprise Narrow Band Internet of Things (NB IoT) devices when the request for background data comprises the mobile-terminated data for NIDD.

4. The method of claim 1, wherein the CP entity for mobility management comprises one of a mobility management entity (MME) or an access and mobility management function (AF).

5. The method of claim 1, further comprising:
   wherein the plurality of UEs of the group comprise CAT-M1 devices when the request for background data comprises the mobile-terminated data for IP data delivery.

6. The method of claim 1, further comprising:
   wherein the UP entity comprises one of a PDN gateway (PGW) or a user plane function (UPF).

7. The method of claim 1, further comprising:
   for each one of the UEs of the group:
   sending, to a control plane (CP) entity for policy control, a message which includes a quality of service (QoS) authorization request, the QoS authorization request including a bandwidth limit for the background data transfer for the UE,
   wherein the CP entity for policy control is enabled to provision and/or activate one or more rules at a CP entity for policy enforcement to enforce the bandwidth limit at the UP entity.

8. The method of claim 7, further comprising:
   wherein the CP entity for policy control comprises one of a policy and charging rules function (PCRF) or a policy control function (PCF).

9. The method of claim 1, wherein the network node includes a lightweight machine-to-machine (LWM2M) server configured for use with the UEs comprising LWM2M clients.

10. Network equipment comprising:
    one or more processors;
    one or more memories for storing program instructions;
    the program instructions comprising a network function for exposure of services and capabilities of a mobile network, and for interfacing with an application server (AS) for communication of data via the mobile network;

the one or more processors being further operative in accordance with program instructions to:

receive a message which includes a request for background data transfer from the AS to a plurality of user equipment (UEs) of a group, the message including a group ID associated with the group and a transfer policy ID associated with transfer policy data;

verify whether a total bandwidth for the background data transfer for the group is within a predefined aggregate bandwidth limit indicated by the transfer policy data obtained based on the transfer policy ID; and cause background data from the AS to be sent to each one of the plurality of UEs via the mobile network, if the total bandwidth for the background data transfer for the group is verified to be within the predefined aggregate bandwidth limit, by:

based on identifying that the request is for background data comprising mobile-terminated data for non-IP data delivery (NIDD), for each one of the plurality of UEs, retrieving an identity of a control plane (CP) entity for mobility management assigned to the UE and sending the background data from the AS to the CP entity for mobility management identified by the retrieved identity for delivery of the background data to the UE; and based on identifying that the request is for background data comprising mobile-terminated data for IP data delivery, for each one of the plurality of UEs, retrieving an identity of a user plane (UP) entity assigned to the UE and sending the background data from the AS to the UP entity identified by the retrieved identity for delivery of the background data to the UE.

11. A method comprising:

at a network node configured for exposure of services and capabilities of a mobile network, and for interfacing with an application server (AS) for communication of data via the mobile network, receiving a message which includes a request for background data transfer from the AS to a plurality of user equipments (UEs), the message including a plurality of UE IDs associated with the UEs and a transfer policy ID associated with transfer policy data;

verifying whether an aggregate bandwidth for the background data transfer for the UEs is within a predefined aggregate bandwidth limit indicated by the transfer policy data obtained based on the transfer policy ID; and causing background data from the AS to be sent to each one of the plurality of UEs via the mobile network, if the aggregate bandwidth is verified to be within the predefined aggregate bandwidth limit, by:

based on identifying that the request is for background data comprising mobile-terminated data for non-IP data delivery (NIDD), for each one of the plurality of UEs, retrieving an identity of a control plane (CP) entity for mobility management assigned to the UE and sending the background data from the AS to the CP entity for mobility management identified by the retrieved identity for delivery of the background data to the UE; and based on identifying that the request is for background data comprising mobile-terminated data for IP data delivery, for each one of the plurality of UEs, retrieving an identity of a user plane (UP) entity assigned to the UE and sending the background data from the AS to the UP entity identified by the retrieved identity for delivery of the background data to the UE.

12. The method of claim 11, further comprising:

wherein the network node for exposure of services and capabilities comprises one of a service and capability exposure function (SCEF) or a network exposure function (NEF), and wherein the network node is configured for interfacing with the AS with use of an application programming interface (API).

13. The method of claim 11, further comprising:

wherein the plurality of UEs comprise Narrow Band Internet of Things (NB IoT) devices when the background data comprises the mobile-terminated data for NIDD.

14. The method of claim 11, further comprising:

wherein the CP entity for mobility management comprises one of a mobility management entity (MME) or an access and mobility management function (AMF).

15. The method of claim 11, further comprising:

wherein the plurality of UEs comprise CAT-M1 devices when the background data comprises the mobile-terminated data for IP data delivery.

16. The method of claim 11, further comprising:

wherein the UP entity comprises one of a PDN gateway (PGW) or a user plane function (UPF).

17. The method of claim 11, further comprising:

at the network node, for each one of the plurality of UEs: sending, to a control plane (CP) entity for policy control, a message which includes a quality of service (QoS) authorization request, the QoS authorization request including a bandwidth limit for the background data transfer for the UE, where the CP entity for policy control is enabled to provision and/or activate one or more rules at a CP entity for policy enforcement to enforce the bandwidth limit at the UP entity.

18. The method of claim 17, further comprising:

wherein the CP entity for policy control comprises one of a policy and charging rules function (PCRF) or a policy control function (PCF).

19. The method of claim 11, further comprising:

at the network node, if the aggregate bandwidth exceeds the predefined aggregate bandwidth limit, refraining from sending the background data to the plurality of UEs; and send to the AS a message which includes an indication of non-delivery.

20. The method of claim 11, wherein:

the network node for exposure of services and capabilities comprises a network exposure function (NEF), the CP entity for mobility management comprises an access and mobility management function (AMF), and the UP entity comprises a user plane function (UPF).

* * * * *